United States Patent
Mizuno et al.

(10) Patent No.: US 9,695,883 B2
(45) Date of Patent: Jul. 4, 2017

(54) CLUTCH DEVICE

(75) Inventors: Kinya Mizuno, Wako (JP); Takeshi Sugano, Wako (JP); Masaya Murao, Wako (JP); Kazuhiko Nakamura, Wako (JP); Junya Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 983 days.

(21) Appl. No.: 13/541,035

(22) Filed: Jul. 3, 2012

(65) Prior Publication Data

US 2013/0008757 A1 Jan. 10, 2013

(30) Foreign Application Priority Data

Jul. 5, 2011 (JP) ................................. 2011-149090

(51) Int. Cl.
*F16D 13/52* (2006.01)
*F16D 13/74* (2006.01)
*F16D 13/56* (2006.01)

(52) U.S. Cl.
CPC ............. *F16D 13/52* (2013.01); *F16D 13/56* (2013.01); *F16D 13/74* (2013.01)

(58) Field of Classification Search
CPC .......... F16D 13/56; F16D 13/44; F16D 13/52; F16D 13/74; F16D 13/54
USPC ..................... 192/85.34, 70.28, 66.31, 66.32
See application file for complete search history.

(56) References Cited

U.S. PATENT DOCUMENTS

| | | | | |
|---|---|---|---|---|
| 2,587,141 | A * | 2/1952 | Grandgirard | 192/85.45 |
| 2,776,031 | A * | 1/1957 | Turnquist et al. | 192/48.9 |
| 6,626,278 | B2 * | 9/2003 | Furuhashi | F16D 13/76 192/70.27 |
| 8,850,915 | B2 * | 10/2014 | Fujimoto | F16H 3/006 180/227 |
| 8,950,560 | B2 * | 2/2015 | Mizuno | F16D 23/12 192/20 |
| 2005/0183921 | A1 * | 8/2005 | Sugita | F16D 13/648 192/70.2 |
| 2005/0194230 | A1 * | 9/2005 | Tsukada | 192/70.27 |
| 2007/0221465 | A1 * | 9/2007 | Okada | F16D 13/04 192/70.27 |
| 2009/0242349 | A1 * | 10/2009 | Miyazaki et al. | 192/70.2 |

(Continued)

FOREIGN PATENT DOCUMENTS

DE 102005009801 A1 9/2005
JP 2005-249083 A 9/2005

(Continued)

*Primary Examiner* — Terry Chau
(74) *Attorney, Agent, or Firm* — Westerman, Hattori, Daniels & Adrian, LLP

(57) ABSTRACT

The clutch device includes, a right pressure flange that brings clutch discs provided on a clutch outer and clutch plates provided on a clutch inner into pressure contact with one another. A pressure ring that moves the right pressure flange with an external force and a clutch spring transmits the force toward a clutch connected position, from the pressure ring to the right pressure flange. Further, a return spring between the clutch inner and the right pressure flange urges the right pressure flange toward a clutch disconnected position. The clutch spring and the return spring are disposed parallel to a clutch axial direction, their respective positions overlapping each other in the clutch axial direction.

5 Claims, 7 Drawing Sheets

(56) References Cited

U.S. PATENT DOCUMENTS

2011/0192699 A1* 8/2011 Yazaki .................. F16D 13/52
192/70.12

FOREIGN PATENT DOCUMENTS

| JP | 2009-236307 A | 10/2009 |
|---|---|---|
| JP | 2010-53988 A | 3/2010 |

\* cited by examiner

CLUTCH DEVICE

CROSS-REFERENCE TO RELATED APPLICATION

This application claims priority of Japanese Application No. 2011-149090, filed Jul. 5, 2011, the entire contents of which are herein incorporated by reference.

TECHNICAL FIELD

The present invention relates to a clutch device for switching between the transmission and non-transmission of power by pressing friction plates in a clutch axial direction or releasing the pressure.

BACKGROUND ART OF THE INVENTION

There is a known structure in which a clutch release mechanism moves a clutch piston away from a clutch inner (moves it to a clutch disconnected position), thereby disconnecting a clutch. The clutch piston is urged toward the clutch inner (toward a clutch connected position) by a disc spring. When the clutch release mechanism is out of operation, the clutch is brought into a connected state by the urging force of the disc spring.

With this structure, the relationship between the moving distance and clutch capacity of a member for moving the clutch piston can be set to be linear, and therefore the clutch capacity can be easily controlled by the moving distance of the member. See JP-A No. 2005-249083.

SUMMARY OF INVENTION

Meanwhile, also in a clutch device that is brought into a clutch connected state by input from the outside and into a clutch disconnected state by cancelling the input, there is a need for a structure that permits easy clutch capacity control and is of a small size so as to be suitable for small vehicles.

Accordingly, it is to achieve easy clutch capacity control and downsizing in a clutch device that is brought into a clutch connected state by input from the outside.

A feature of the invention described herein is that there is provided a clutch device including: a clutch outer and a clutch inner coaxially supported on a rotating shaft; outer friction plates held by engagement with the clutch outer; and inner friction plates held by engagement with the clutch inner, for switching between transmission and non-transmission of power between the clutch outer and the clutch inner by bringing the outer and inner friction plates into pressure contact with one another in a clutch axial direction or releasing the pressure contact.

The clutch device includes: a clutch piston (that is supported movably in the clutch axial direction by the clutch inner and brings the outer and inner friction plates into pressure contact with one another in cooperation with a supporting portion of the clutch inner; an input portion that moves the clutch piston with a force toward a clutch connected position input from an external force mechanism to bring the outer and inner friction plates into pressure contact with one another; a clutch spring that is disposed between the input portion and the clutch piston and transmits to the clutch piston the force toward the clutch connected position input to the input portion from the external force mechanism; and a return spring that is disposed between the clutch inner and the clutch piston and urges the clutch piston toward a clutch disconnected position with a force smaller than that of the clutch spring. The clutch spring and the return spring are disposed parallel to the clutch axial direction. A plane perpendicular to an axis of the clutch passes through the clutch spring and the return spring.

An additional feature of the disclosure is that the input portion fits movably in the clutch axial direction in an inner periphery of the clutch piston.

Another feature of the disclosure is that the clutch spring and the return spring include plural clutch springs and plural return springs, respectively. The plural clutch and return springs are alternately arranged in a clutch rotation direction.

An additional feature of the disclosure is that the clutch inner has a cylindrical wall that supports the inner friction plates. The cylindrical wall is provided with a notch serving as a receiving portion of the return spring.

Another feature of the disclosure is that the clutch piston is provided with a detent that engages in a non-relatively-rotatable manner an end of the notch on a side on which the clutch piston is located.

Still another feature of the disclosure is that the clutch piston has an inner supporting portion that protrudes coaxially toward the clutch inner. The inner supporting portion has: an outer cylindrical wall that extends toward the clutch inner from the clutch piston; a bottom wall that extends toward a clutch inner periphery from an end of the outer cylindrical wall on a side on which the clutch inner is located; and an inner cylindrical wall that rises from an inner peripheral edge of the bottom wall toward the clutch piston. An inner periphery of the inner cylindrical wall is fitted and supported on an outer periphery of a hub of the clutch inner. Also, the clutch spring has one end supported by the input portion and the other end supported by a folded-back portion of the clutch piston. The folded-back portion is surrounded by the outer cylindrical wall, the bottom wall, and the inner cylindrical wall.

Also another feature of the disclosure is that the clutch inner is formed with a feed oil passage, the feed oil passage opening toward the folded-back portion of the clutch piston.

According to the disclosure, when a force toward the clutch connected position is input to the input portion of the clutch device from the external force mechanism, the input portion and the clutch piston move toward the clutch connected position while elastically deforming the return spring earlier than the clutch spring, so that the clutch piston abuts on either of the friction plates (the connection of the clutch device is started).

Thereafter, when the input portion moves further toward the clutch connected position, the clutch spring starts to be elastically deformed following the return spring, causing the clutch connection state in which the friction plates are brought into pressure contact with one another by the spring force thereof.

In other words, the spring force of the clutch spring brings the friction plates into pressure contact with one another, and consequently, the moving distance of the input portion is proportional to the clutch capacity, thereby allowing precise clutch capacity control.

Furthermore, the clutch spring and the return spring are disposed parallel to each other along the clutch axial direction. A plane perpendicular to an axis of the clutch passes through the clutch spring and the return spring. Thus, the clutch device can be reduced in axial size, as compared with the case where the clutch spring and the return spring are axially aligned.

Further, the clutch piston and the input portion can be compactly disposed in the clutch axial direction.

According to the disclosure, a well-balanced and efficient arrangement of the springs is possible.

Still further, the return spring can be disposed immediately on the inner peripheral side of the friction plates, thereby allowing a reduction in radial size of the clutch device.

Additionally, the relative rotation between the clutch inner and the clutch piston can be efficiently restricted by using the notch for receiving the return spring.

Still further, positioning of the clutch spring can be facilitated, and the clutch spring can be disposed in a stretchable manner.

Moreover, oil can be efficiently supplied to the fitting portion between the clutch inner and the clutch piston.

BRIEF DESCRIPTION OF DRAWINGS

The advantages of the invention will become apparent in the following description taken in conjunction with the drawings, wherein.

DETAILED DESCRIPTION OF THE INVENTION

Figure 1:
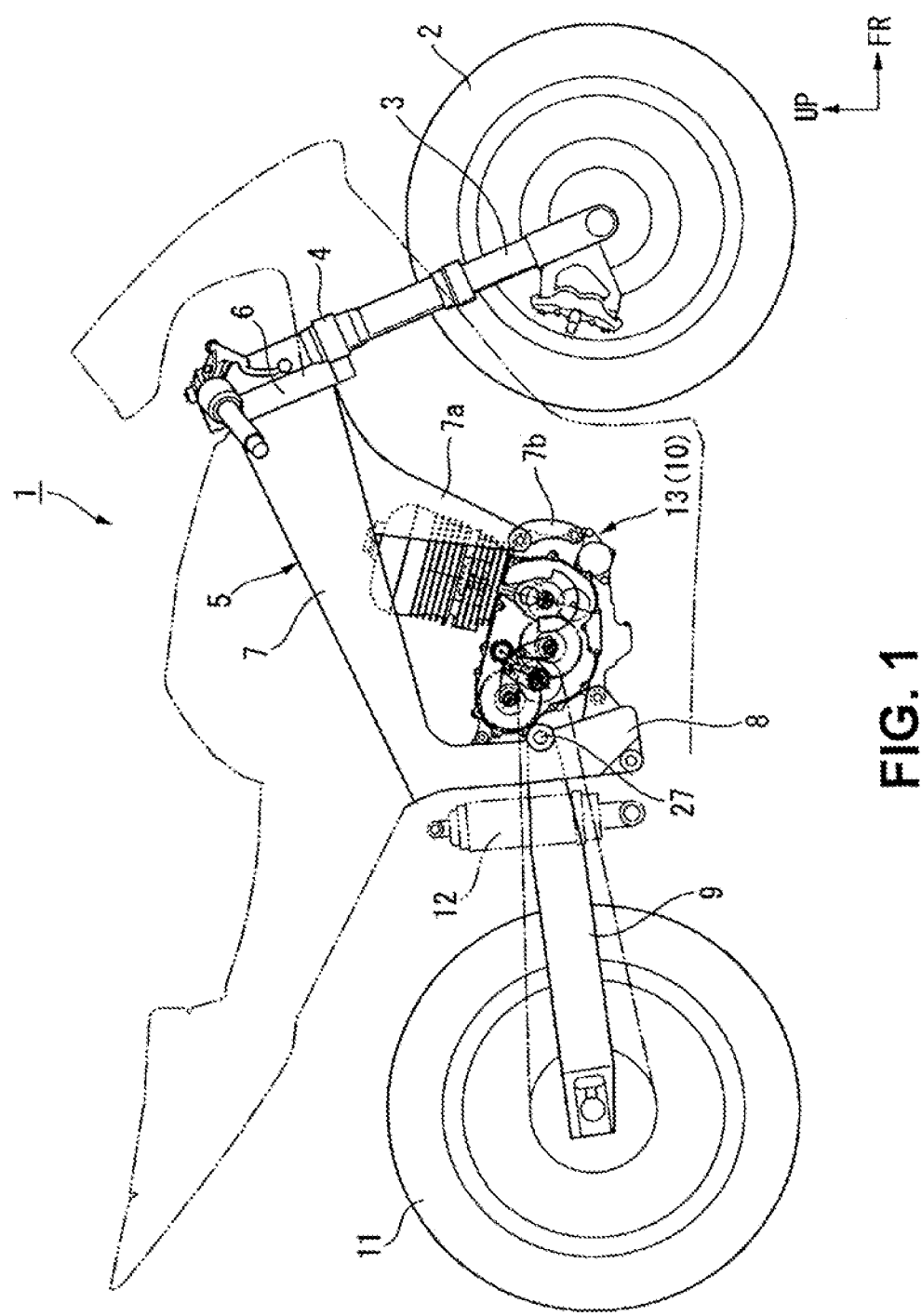
FIG. 1 is a right side view of a motorcycle according to an embodiment of the present invention.

Hereinafter, an embodiment of the present invention will be described with reference to the accompanying drawings. It is to be noted that, unless otherwise stated, references to directions such as front, rear, left and right in the following description are made based on the directions of a vehicle described below. It is also to be noted that, in the drawings used in the following description, there are suitably shown arrow FR indicating the front of the vehicle, arrow LH indicating the left of the vehicle, and arrow UP indicating the upper side of the vehicle.

In a motorcycle (a saddle-ride type vehicle) 1 shown in FIG. 1, an upper portion of a front fork 3 that journals a front wheel 2 is steerably pivotally supported through a steering stem 4 by a head pipe 6 at a front end of a body frame 5. A main frame 7 extends obliquely downward and rearward from the head pipe 6. An upper end of a pivot frame 8 is connected to a rear end of the main frame 7. A front end of a swing arm 9 is pivotally supported in a vertically swingable manner by a vertically intermediate portion of the pivot frame 8. A rear wheel 11 is journaled to a rear end of the swing arm 9. A cushion unit 12 is interposed between a front portion of the swing arm 9 and a rear portion of the body frame 5. It is to be noted that reference sign 27 in the drawing denotes a pivot shaft that serves as a swing shaft of the swing arm 9; 7a, a down frame that extends obliquely downward and rearward from the lower side of a front portion of the main frame 7; and 7b, a hanger bracket attached to a leading end of the down frame 7a.

A power unit 10, serving as a power mechanism of the motorcycle 1, is mounted on the body frame 5.

Figure 2:
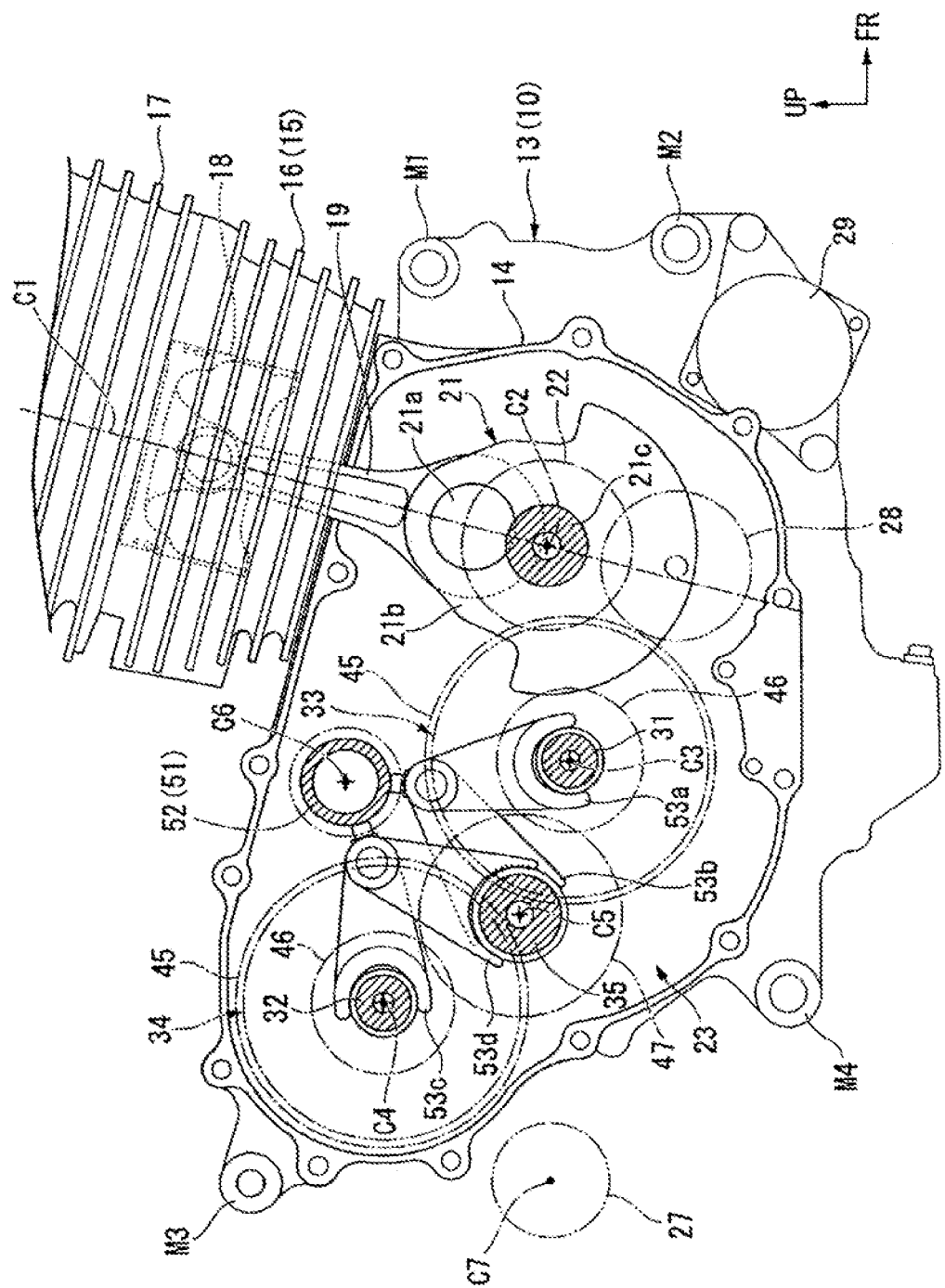
FIG. 2 is a right side view of a power unit of the motorcycle.

Referring also to FIG. 2, the power unit 10 integrally has an air-cooled single-cylinder engine (hereinafter referred to simply as "engine") 13 that constitutes a front portion thereof, and a twin-clutch transmission (hereinafter referred to simply as "transmission") 23 that is continuous with the rear of the engine 13.

The engine 13 has a basic construction in which a cylinder 15 is provided in an upstanding position tilting forward in a vertical direction on a crankcase (a power unit case) 14 thereof. It is to be noted that reference sip C1 in the drawing denotes a cylinder axis parallel to the upstanding direction of the cylinder 15. The power unit 10 is fixedly supported on the body frame 5 with the top and bottom of the front end of the crankcase 14 respectively attached to lower ends of the down frame 7a and the hanger bracket 7b by bolting or the like, and the top and bottom of the rear end of the crankcase 14 attached to the top and bottom, respectively, of the pivot frame 8 by bolting or the like. It is to be noted that reference signs M1 and M2 in the drawing denote front frame fixing portions at the top and bottom of the front end of the crankcase 14; and M3 and M4 denote rear frame fixing portions at the top and bottom of the rear end of the crankcase 14.

The cylinder 15 has, in order from the side thereof on which the crankcase 14 is located, a cylinder body 16, a cylinder head 17, and a head cover (not shown). An intake system component and an exhaust system component (which are not shown) are respectively connected to a rear portion (an intake side) and a front portion (an exhaust side) of the cylinder head 17.

A piston 18 that reciprocates along the cylinder axis C1 is fitted within the cylinder body 16. The reciprocating motion of the piston 18 is converted into the rotary motion of a crankshaft 21 through a connecting rod 19.

Figure 3:
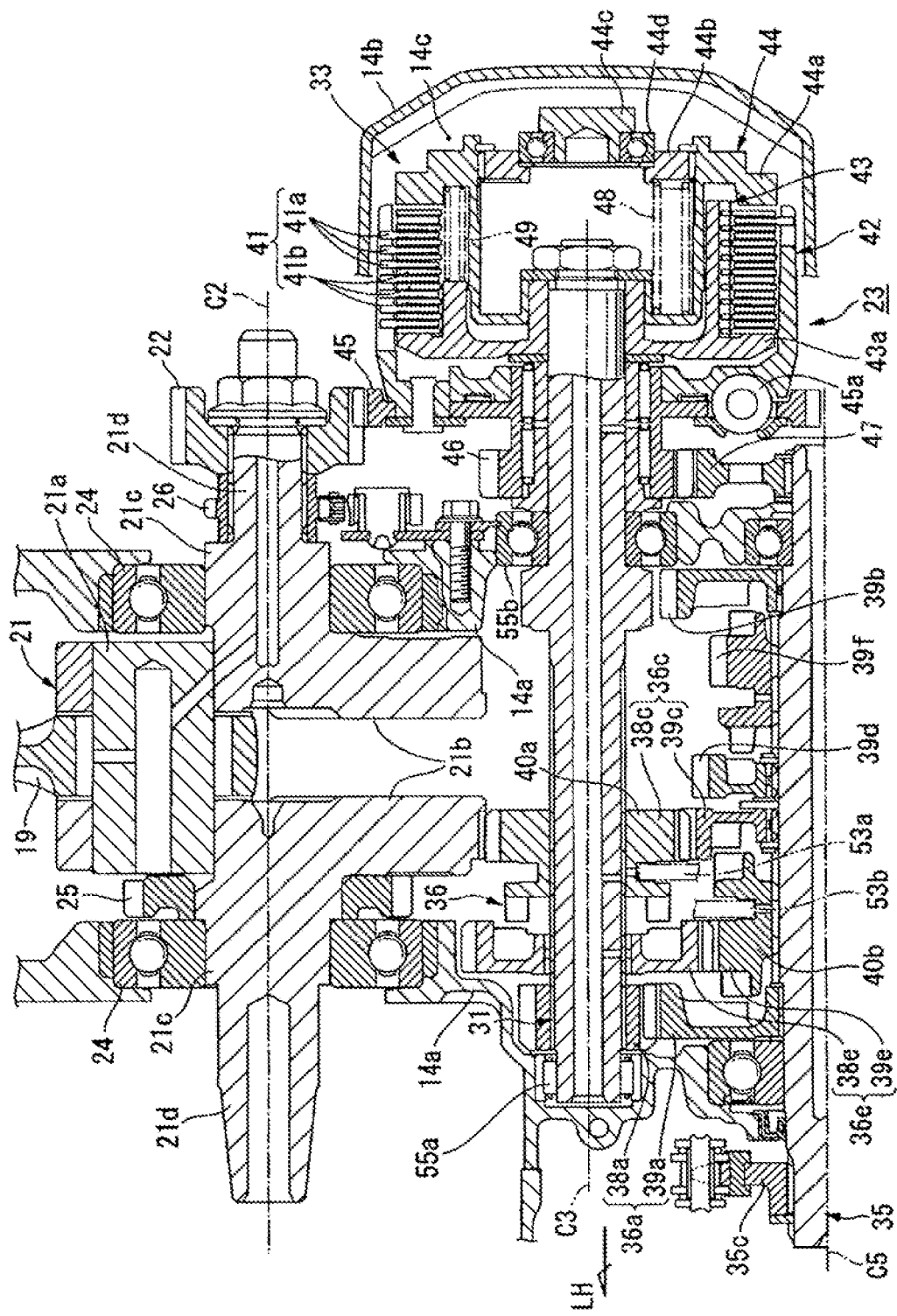
FIG. 3 is a sectional view of the periphery of a crankshaft and a first main shaft in the power unit, parallel to the axes thereof.

As shown in FIGS. 2 and 3, the crankshaft 21, serving as a power shaft of the power unit 10, is housed within a front portion of the crankcase 14. The crankshaft 21 has: a pair of left and right crank webs 21b that support a crankpin 21a; left and right journal portions 21c that protrude laterally outward from the left and right crank webs 21b, respectively; and left and right support shafts 21d that extend further laterally outward from the left and right journal portions 21c, respectively. The left support shaft 21d integrally rotatably supports an alternator rotor not shown. The right support shaft 21d integrally rotatably supports a primary drive gear 22 for power transmission to the transmission 23.

It is to be noted that reference sign C2 in FIG. 3 denotes a rotation axis (a crank axis) of the crankshaft 21 (the left and right journal portions 2c) which is parallel to a left-right direction; 24, left and right radial ball bearings that rotatably support the left and right journal portions 21c, respectively, on left and right side walls 14a of the crankcase 14; 25, an oil pump drive gear that is supported between the left crank web 21b and the left journal portion 21c so as to be rotatable integrally therewith; and 26, a cam drive sprocket that is supported between the right journal portion 21c and the primary drive gear 22 so as to be rotatable integrally therewith.

Also, reference shin 27 in FIG. 2 denotes the pivot shaft parallel to the left-right direction which supports a front end of the swing arm 9; C7, a swing axis (a pivot axis) of the pivot shaft 27 which is parallel to the left-right direction; 28, an oil pump that is disposed below the crankshaft 21 within the crankcase 14; and 29, a starter motor that is attached to the lower side of a front end of the crankcase 14.

Referring to FIG. 2, within a rear portion of the crankcase 14, there are housed the transmission 23 that is provided in a power transmission path between the engine 13 and the drive wheel, and a change mechanism 51 that shifts the shift position of the transmission 23. The rotative power of the crankshaft 21 is outputted to the rear left side of the crankcase 14 through the transmission 23, and then transmitted to the rear wheel 11, for example, through a chain transmission mechanism.

Figure 4:
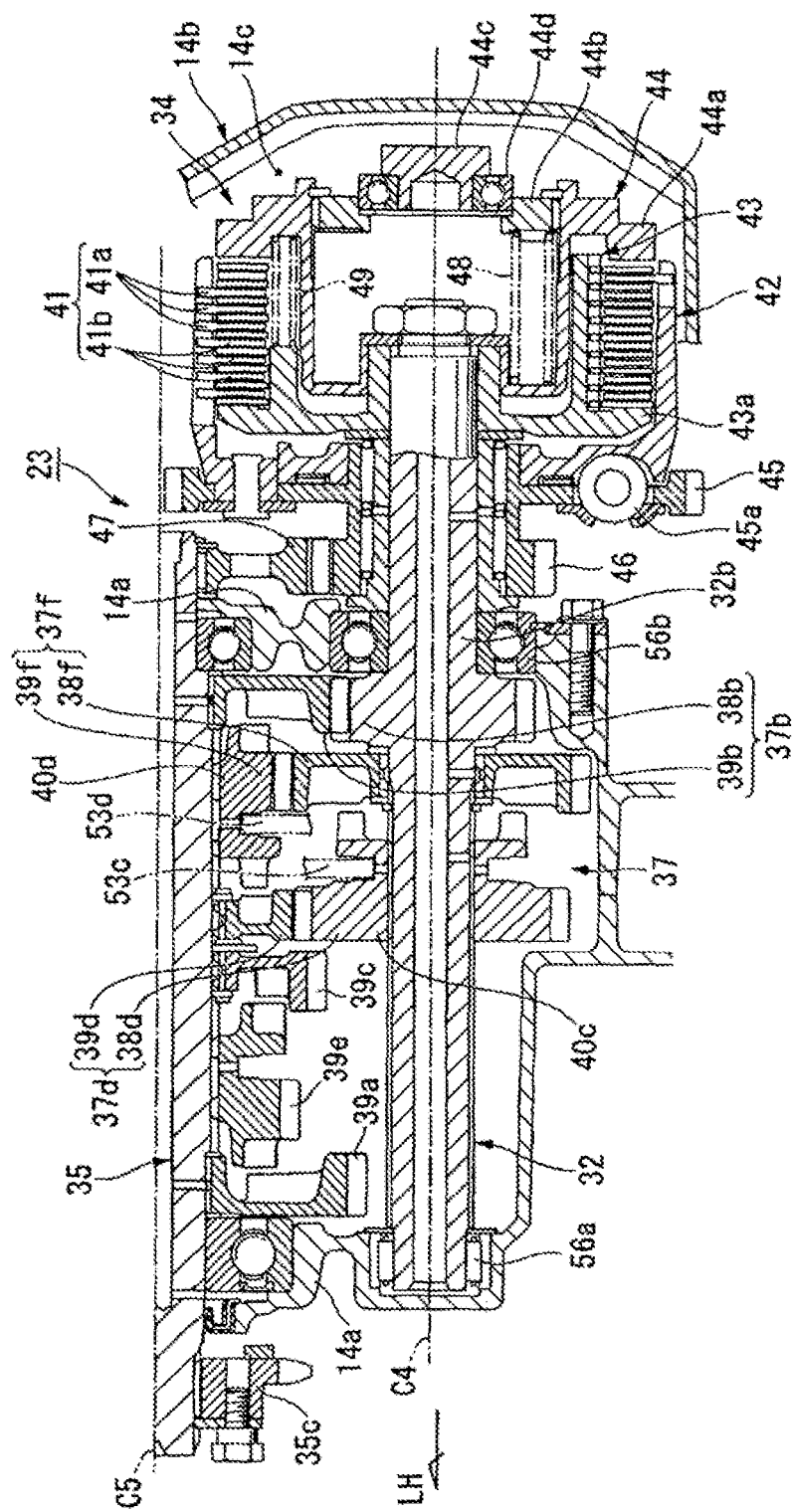
FIG. 4 is a sectional view of the periphery of a second main shaft in the power unit, parallel to the axis thereof.

Referring also to FIGS. 3 and 4, the transmission 23 has: first and second main shafts 31 and 32 that extend along the left-right direction parallel to and separately from each other; first and second clutches 33 and 34 that are coaxially supported on tight ends of the main shafts 31 and 32, respectively; a single countershaft 35 that extends along the left-right direction parallel to and separately from the main shafts 31 and 32; a first gear group 36 provided extending across the first main shaft 31 and the countershaft 35; and a second gear group 37 provided extending across the second main shaft 32 and the countershaft 35. The first gear group 36 is composed of plural gear trains (gear pairs) for odd-numbered shift positions. The second gear group 37 is composed of plural gear trains (gear pairs) for even-numbered shift positions. It is to be noted that reference signs C3, C4, and C5 denote rotation axes (namely, a first main shaft axis, a second main shaft axis, and a countershaft axis, respectively) of the main shafts 31 and 32 and the countershaft 35 which are parallel to the left-right direction.

The transmission 23 allows power transmission selectively using any one of the above-described gear trains. During normal operation in which the shift position is constant, the transmission 23 brings one of the clutches 33 and 34 into a connected state and the other into a disconnected state to perform power transmission using any one of the gear trains coupled to the clutch being in the connected state and create the state where power transmission using a gear train preliminarily selected from among the gear trains coupled to the clutch being in the disconnected state can be performed. In this state, the clutch being in the connected state is disconnected, and the clutch being in the disconnected state is connected (i.e., switching between the clutches 33 and 34 is performed), thereby shifting the shift position between the odd-numbered and even-numbered shift positions.

Referring to FIGS. 3 and 4, each of the clutches 33 and 34 is a wet multiplate clutch having plural axially alternately overlapping clutch plates 41, and housed within a right side portion of the crankcase 14 (within a clutch chamber 14c). It is to be noted that reference sign 14b in each drawing denotes a clutch cover that covers the clutch chamber 14c (each of the clutches 33 and 34) from the right side and the periphery (front, rear, left, and right) thereof.

The clutches 33 and 34 are of mechanical types in which the clutch plates 41 are brought into frictional engagement by the pressure from their respective clutch drive mechanisms (not shown).

It should be noted that the motorcycle 1 includes the so-called AMT (Automatic Manual Transmission), and is designed to allow the clutches 33 and 34 to be connected and disconnected in accordance with an operation of a shift operating element or a predetermined shift timing by using the driving force of a clutch actuator such as an electric motor.

The transmission 23 is of a constant-mesh type in which a drive gear and a driven gear corresponding to each shift position are in constant mesh. The gears are broadly classified into free gears that are relatively rotatable with respect to their respective support shafts, and slide gears that are spline-fitted to the shafts. By axially moving any slide gear with the operation of the change mechanism 51, the gears are shifted so that power transmission using the gear tram corresponding to any one of the shift positions is performed.

The shafts 31, 32, and 35 are arranged in the following order from the crankshaft 21 to the rear: the first main shaft 31, the countershaft 35, and the second main shaft 32, and located higher with rearward distance from the crankshaft 21. A shift drum 52 of the change mechanism 51 is disposed above the first main shaft 31 and forwardly of the second main shaft 32.

The change mechanism 51 has: the shift drum 52 of a hollow cylindrical shape parallel to the shafts 31, 32, and 35; and four shift forks 53a to 53d that engage four lead grooves (not shown) formed on the outer periphery of the shift drum 52. In response to the rotation of the shift drum 52, the shift forks 53a to 53d move individually axially in accordance with the patterns of the respective lead grooves to individually axially move shifters 40a to 40d of the transmission 23 which is to be described later. Thus, the gears to be used for power transmission between one of the main shafts 31 and 32 and the countershaft 35 in the transmission 23 are arbitrarily selected (established as power transmission elements). It is to be noted that reference sign C6 denotes a rotation axis (a drum axis) of the shift drum 52 which is parallel to the left-right direction. A left end of the countershaft 35 protrudes outwardly of the crankcase 14, the protruding portion being provided with a drive portion (a drive sprocket in the drawing) 35c of the transmission mechanism.

Referring to FIG. 3, the first main shaft 31 has a left end rotatably supported by the left sidewall 14a of the crankcase 14 through a left radial needle bearing 55a, and a right end rotatably supported by the right sidewall 14a of the crankcase 14 through a right radial ball bearing 55b. The first clutch 33 is coaxially supported at a portion of the first main shaft 31 which extends rightward of the right radial ball bearing 55b.

Referring to FIG. 4, the second main shaft 32 has a left end rotatably supported by the left sidewall 14a of the crankcase 14 through a left radial needle bearing 56a, and a right end rotatably supported by the right sidewall 14a of the crankcase 14 through a right radial ball bearing 56b. The second clutch 34 is coaxially supported at a portion of the second main shaft 32 which extends rightward of the right radial ball hearing 56b.

Referring to FIGS. 2 to 4, rotative power is input to a clutch outer 42 of the first clutch 33 from the primary drive gear 22 (the crankshaft 21) through a large-diameter transmission gear 45 of the first clutch 33.

On the other hand, rotative power from the crankshaft 21 is transmitted to the clutch outer 42 of the second clutch 34 through in the following order: the primary drive gear 22, the large-diameter transmission gear 45 of the first clutch 33, a small-diameter transmission gear 46 of the first clutch 33, an idle gear 47, the small-diameter transmission gear 46 of the second clutch 34, and the large-diameter transmission gear 45 of the second clutch 34.

The gear groups 36 and 37 constitute a total of six shift positions.

The first gear group 36 constitutes first-, third-, and fifth-speed gear trains 36a, 36c, and 36e corresponding to odd-numbered positions (first, third, and fifth speeds), and is provided in such a manner as to extend between right portions of the first main shaft 31 and the countershaft 35. The first-speed gear train 36a is composed of a first-speed drive gear 38a and a first-speed driven gear 39a. The third-speed gear train 36c is composed of a third-speed drive gear 38c and a third-speed driven gear 39c. The fifth-speed gear train 36e is composed of a fifth-speed drive gear 38e and a fifth-speed driven gear 39e.

On the other hand, the second gear group 37 constitutes second-, fourth-, and sixth-speed gear trains 37b, 37d, and 37f corresponding to even-numbered positions (second, fourth, and sixth speeds), and is provided in such a manner as to extend between left portions of the second main shaft 32 and the countershaft 35. The second-speed gear train 37b is composed of a second-speed drive gear 38b and a second-speed driven gear 39b. The fourth-speed gear train 37d is composed of a fourth-speed drive gear 38d and a fourth-speed driven gear 39d. The sixth-speed gear train 37f is composed of a sixth-speed drive gear 38f and a sixth-speed driven gear 39f.

Any one of the gear trains of the gear groups 36 and 37 is selectively established, so that the rotative power of the crankshaft 21 which is input to either the main shaft 31 or 32 is reduced in speed at a predetermined reduction ratio and then transmitted to the countershaft 35.

An ECU (not shown), serving as a controller for the transmission 23, controls the operation of the clutches 33 and 34 and the shift drum 52 on the basis of the information detected by various sensors to shift the shift position of the transmission 23.

More specifically, the transmission 23 brings one of the clutches 33 and 34 into the connected state to perform power transmission using any one of the gear trains operatively connected to the one of the clutches 33 and 34 and preliminarily select a gear train to be established next from among the gear trains operatively connected to the other of the clutches 33 and 34. In this state, disconnection of the one of the clutches 33 and 34 and connection of the other one are simultaneously performed, thereby switching to power transmission using the preliminarily selected gear train. Thus, upshifting or downshifting of the transmission 23 is performed.

In the transmission 23, after an engine start of the motorcycle 1 and during a stop of the motorcycle 1, the clutches 33 and 34 are held in the disconnected state, and then, in preparation for startup of the motorcycle 1, moved from a neutral position where power transmission using any one of the gear trains is disabled to a first-speed position where a first-speed gear (a startup gear, the first-speed gear train 36a) is established. In this state, for example, the engine rotational speed increases to bring the first clutch 33 into the connected state through a half-clutch state so as to start the motorcycle 1.

While the motorcycle 1 is moving, the transmission 23 brings one clutch corresponding to a current shift position into the connected state, and at the same time, preliminarily establishes the gear train corresponding to the next shift position from among any one of the gear trains coupled to the other clutch being in the disconnected state, on the basis of vehicle driving conditions or the like.

More specifically, when the current shift position is an odd-numbered position (or an even-numbered position), the next shift position is to be an even-numbered position (or an odd-numbered position). Therefore, the rotative power of the crankshaft 21 is input to the first main shaft 31 (or the second main shaft 32) through the first clutch 33 (or the second clutch 34) being in the connected state. At this time, since the second clutch 34 (or the first clutch 33) is in the disconnected state, no rotative power of the crankshaft 21 is input to the second main shaft 32 (or the first main shaft 31).

After that, when the ECU determines that the shift timing is reached, switching to power transmission using the gear train corresponding to the preliminarily established next shift position is performed simply by bringing the first clutch 33 (or the second clutch 34) being in the connected state into the disconnected state, and the second clutch 34 (or the first clutch 33) being in the disconnected state into the connected state. Thus, rapid and smooth transmission without a time lag or interruption of the power transmission during shift transmission is performed.

Figure 5:
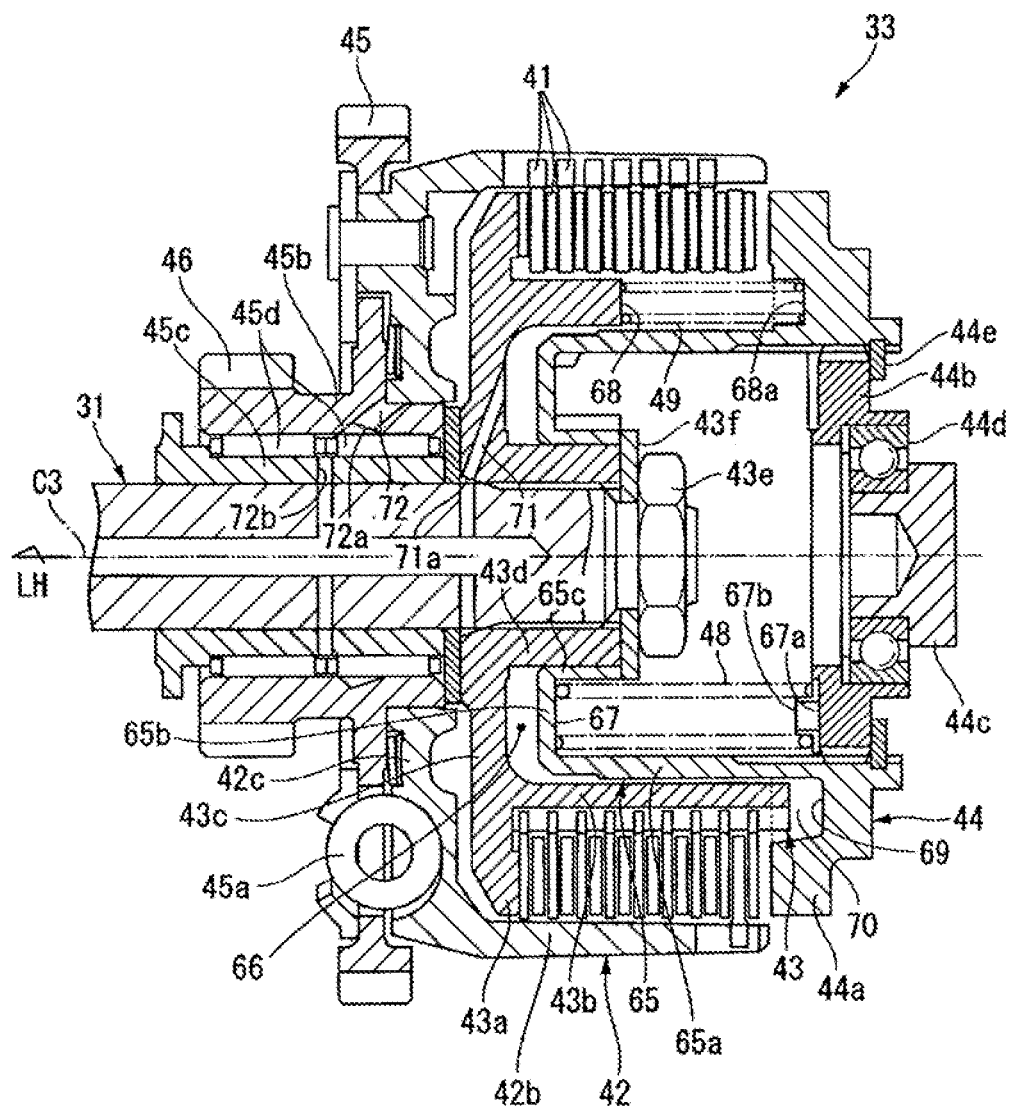
FIG. 5 is a sectional view of a first clutch in the power unit, parallel to the axis thereof.

Referring to FIGS. 3 and 5, the first clutch 33 has: the clutch outer 42 that has a bottomed cylindrical shape coaxial with the first main shaft 31 and opening rightward, and is supported in a relatively rotatable manner by the first main shaft 31 to constantly perform rotative power transmission between the crankshaft 21 and the clutch outer 42; a clutch inner 43 that has the same bottom cylindrical shape as the clutch outer 42, is coaxially disposed on the inner peripheral side of the clutch outer 42 and supported in a relatively rotatable manner by the first main shaft 31; plural clutch discs 41a (the clutch plates 41) that are axially stacked on the inner peripheral side of a cylindrical wall 42b of the clutch outer 42 and supported in an integrally rotatable manner and an axially movable manner by the inner periphery of the cylindrical wall 42b; plural clutch plates 41b (the clutch plates 41) that are axially stacked on the outer peripheral side of a cylindrical wall 43b of the clutch inner 43 in an alternating manner between the clutch discs 41a and the clutch plates 41b and supported in an integrally rotatable manner and an axially movable manner by the outer periphery of the cylindrical wall 43b; and a pressure unit 44 that is coaxially disposed on an open side of the clutch inner 43 to press leftward the plural clutch plates 41 (hereinafter also referred to as "clutch plate group 41") stacked between the cylindrical walls 42b and 43b.

On the left side of a bottom wall 42c of the clutch outer 42, there is mounted, through a damper 45a, the large-diameter transmission gear (primary driven gear) 45 having a diameter larger than the bottom wall 42c. The large-diameter transmission gear 45 has a meshing engagement with the primary drive gear 22 provided on a right end of the crankshaft 21.

A cylindrical outer hub 45b, which is coaxial with the first main shaft 31 and in which the first main shaft 31 is inserted, is integrally formed on the inner peripheral side of the large-diameter transmission gear 45. The outer hub 45b is rotatably supported through a pair of radial needle bearings 45d by the outer periphery of a distance collar 45c. The distance collar 45c is disposed between the right radial ball bearing 55b and the clutch inner 43 to allow insertion of the first main shaft 31.

The small-diameter transmission gear 46 having a relatively small diameter is integrally formed on the left-hand outer periphery of the outer hub 45b. The small-diameter transmission gear 46 has a meshing engagement with the idle gear 47 rotatably supported by a right end of the countershaft 35. The idle gear 47 also has a meshing engagement with the large-diameter transmission gear 45 of the second clutch 34 is to be described later.

A left pressure flange 43a is integrally formed on the outer periphery of a bottom wall 43c of the clutch inner 43. The left pressure flange 43a is adjacent to the left side of a left side surface of the clutch plate group 41.

A right pressure flange (pressure plate) 44a of the pressure unit 44 is adjacent to the right side of a right side surface of the clutch plate group 41. The right pressure flange 44a is moved leftward by the operation of the clutch drive mechanism. Thus, the clutch plate group 41 is pressed in sandwich relation between the left and right pressure flanges 43a and 44a and brought into integral frictional engagement, causing a clutch connected state in which torque can be transmitted between the clutch outer 42 and the clutch inner 43. On the other hand, the right pressure flange 44a is moved rightward to release the friction engagement, causing a clutch disconnected state in which the torque transmission is disabled.

The pressure unit 44 has the right pressure flange 44a that is integrally rotatable with the clutch inner 43. An inner supporting portion 65 of the same bottomed cylindrical shape as the clutch inner 43 is coaxially disposed on the inner peripheral side of the clutch inner 43. The inner supporting portion 65 has: an outer cylindrical wall 65a that extends toward the clutch inner 43 (leftward) from the right pressure flange 44a; a bottom wall 65b that extends toward a clutch inner periphery from an end (a left end) of the outer cylindrical wall 65a on the side on which the clutch inner 43 is located; and an inner cylindrical wall 65c that rises from an inner peripheral edge of the bottom wall 65b toward the right pressure flange 44a (rightward). A right end (an open end) of the outer cylindrical wall 65a is integrally continuous with the right side of the inner periphery of the right pressure flange 44a. In other words, the right pressure flange 44a and the inner supporting portion 65 are integrally formed.

Also, the pressure unit 44 has: a pressure ring 44b that is disposed on the inner peripheral side of the right pressure flange 44a and can press leftward the inner supporting portion 65 (the right pressure flange 44a) through a clutch spring 48; and a pressure cap 44c that engages in a relatively rotatable manner in an inner periphery of the pressure ring 44b through a radial ball bearing 44d and can press leftward the pressure ring 44b. The pressure ring 44b can move axially with respect to the right pressure flange 44a, with its outer periphery spline-fitted to the inner periphery of the right pressure flange 44a. It is to be noted that reference sign 44e denotes a snap ring for restricting the rightward movement of the pressure ring 44b.

An input portion of the clutch drive mechanism is disposed on the right side of the pressure cap 44c. The input portion presses leftward the right pressure flange 44a through the pressure cap 44c and the pressure ring 44b, thereby pressing in sandwich relation the clutch plate group 41 and bringing the clutch plate group 41 into frictional engagement. On the other hand, when the pressure is released, the right pressure flange 44a is moved rightward by the action of a return spring 49 provided between the right pressure flange 44a and the cylindrical wall 43b of the clutch inner 43, so that the above-described sandwich pressure and frictional engagement are released.

A cylindrical inner hub 43d, which is coaxial with the first main shaft 31 and in which the first main shaft 31 is inserted, is integrally formed in a manner rising rightward on the inner peripheral side of the bottom wall 43c of the clutch inner 43. The inner periphery of the inner hub 43d is supported by spline-fitting to the outer periphery of the first main shaft 31. The inner periphery of the inner cylindrical wall 65c of the inner supporting portion 65 is fitted and supported on the outer periphery of the inner hub 43d.

A lock nut 43e for fixing the inner hub 43d (the clutch inner 43) or the like is screwed on a right end of the first main shaft 31. The right end of the inner cylindrical wall 65c abuts on a lock washer 43f held between the lock nut 43e and the inner hub 43d. Thus, the rightward movement of the right pressure flange 44a under the urging force of the return spring 49 is restricted (this position of the right pressure flange 44a is its initial position).

In this state, the bottom wall 65b of the inner supporting portion 65 and the bottom wall 43c of the clutch inner 43 are spaced apart in the axial direction to form a clearance 66 in between. The clearance 66 allows the inner supporting portion 65 (the right pressure flange 44a) to move leftward, so that the clutch plate group 41 can be pressed in sandwich relation between the left and right pressure flanges 43a and 44a.

Figure 6:
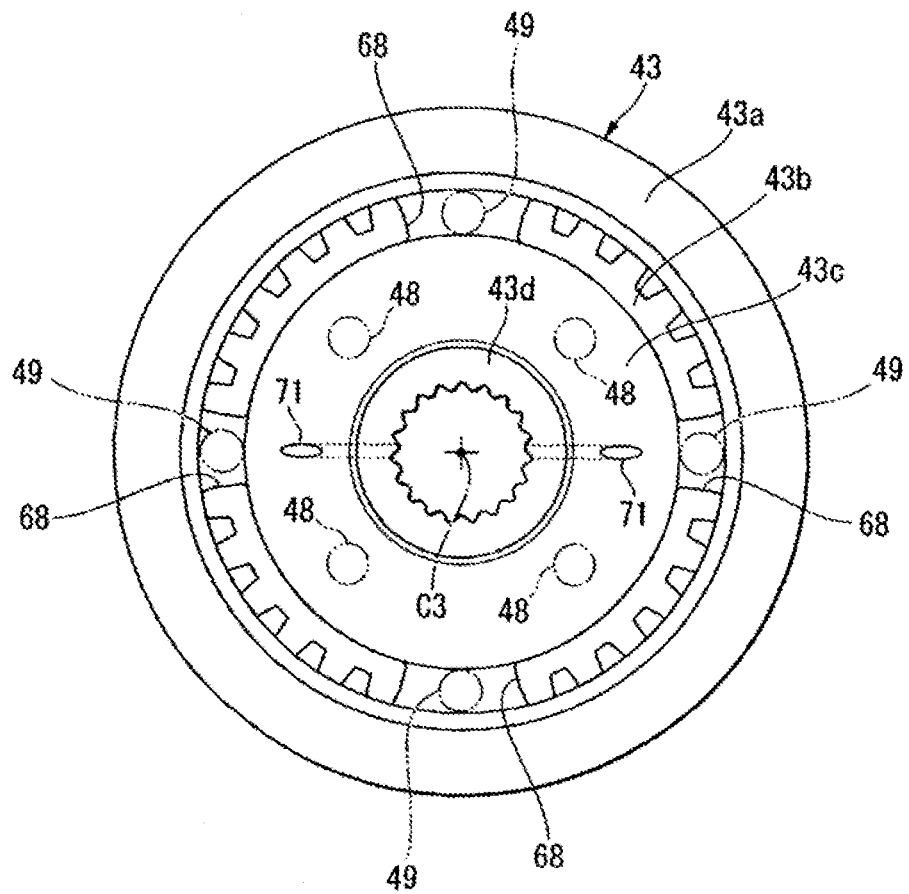
FIG. 6 is a right side view of a clutch inner of the first clutch.

The clutch spring 48 is a compression coil spring extending parallel to a clutch axial direction, and includes plural (four) clutch springs 48 that are arranged with equal spacing in a clutch circumferential direction (see FIG. 6). The clutch springs 48 are provided in a compressed state under a predetermined initial load between the left side of the pressure ring 44b and the right side of the bottom wall 65b of the inner supporting portion 65. A relatively-shallow right recess 67a for fitting a right end of each of the clutch springs 48 through a guide 67b is formed on the left side of the pressure ring 44b. A relatively-deep left recess 67 for fitting a left end of each of the clutch springs 48 is formed in a left portion of the inner supporting portion 65. The left recess 67 corresponds to a folded-back portion surrounded by a left portion of the outer cylindrical wall 65a, the bottom wall 65b, and the inner cylindrical wall 65c.

The return spring 49 is a compression coil spring extending parallel to the clutch axial direction (parallel to the clutch springs 48), and includes plural (four) return springs 49 that are arranged with equal spacing in the clutch circumferential direction (see FIG. 6). The return springs 49 are located toward a clutch outer periphery relative to the clutch springs 48 and each arranged in the bisector of the angle between the adjacent clutch springs 48. In other words, the clutch springs 48 and the return springs 49 are alternately arranged so as to form equal angles in a clutch rotation direction. The return springs 49 are provided in compressed state under a predetermined initial load between the left end surfaces of slit-like notches 68 formed in the cylindrical wall 43b of the clutch inner 43 and the right end surfaces of right recesses 68a formed on the left side of the inner periphery of the right pressure flange 44a.

The total spring force of the return springs 49 is smaller than that of the clutch springs 48. Therefore, when the pressure ring 44b moves leftward, only the return springs 49 are compressed, while the clutch springs 48 are not compressed, to cause the inner supporting portion 65 (the right pressure flange 44a) to move leftward.

Thereafter, even when the right pressure flange 44a abuts on the right side surface of the clutch plate group 41, the pressure ring 44b can move further leftward. This further leftward movement of the pressure ring 44b initiates compression of the clutch springs 48. And then when the pressure ring 44b is fully moved leftward, the clutch plate group 41 is pressed in sandwich relation between the left and right pressure flanges 43a and 44a by the spring force of the clutch springs 48.

Figure 7:
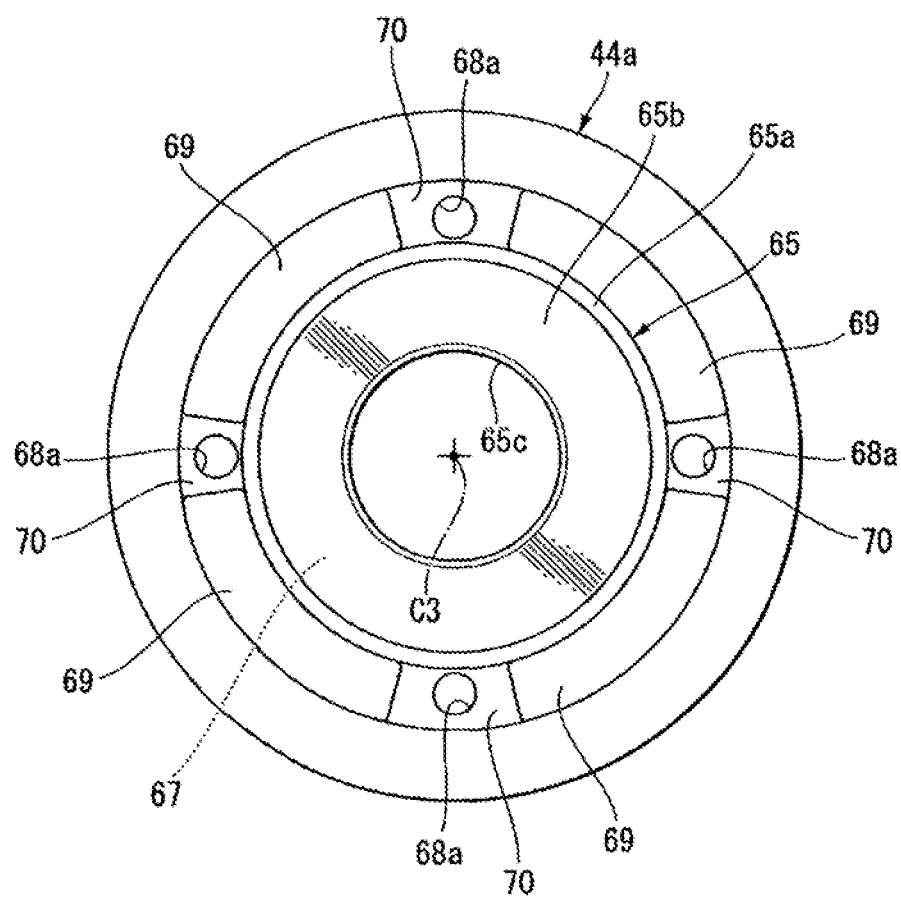
FIG. 7 is a left side view of a right pressure flange of the first clutch.

Referring to FIGS. 5 and 7, arc-shaped grooves 69 are formed on the left side of the inner periphery of the right pressure flange 44a so as not to interfere with the leading end (the right end) of the cylindrical wall 43b of the clutch inner 43. Detents 70 protruding toward the clutch inner 43 are formed at portions at the bottom of the arc-shaped grooves 69 facing the return springs 49 (the portions forming the right recesses 68a). Each of the detents 70 engages the leading end of the corresponding notch 68 during the interval that the right pressure flange 44a moves from the initial position to a position to press in sandwich relation the clutch plate group 41, thereby restricting the relative, rotation about the axis C3 between the clutch inner 43 and the right pressure flange 44a.

Referring to FIG. 5, an inner oil groove 71a that allows a portion of engine oil in the first main shaft 31 to circulate therethrough is formed between a left inner periphery of the inner hub 43d and an outer periphery of the first main shaft 31. An inner oil passage 71 that allows communication between the inner oil groove 71a and the clearance 66 is formed in the bottom wall 43c of the clutch inner 43. Through the inner oil passage 71, a portion of the engine oil in the first main shaft 31 is supplied to the fitting portion between the clutch inner 43 and the right pressure flange 44a, the clutch plate group 41 or the like.

A portion of the engine oil in the first main shaft 31 is supplied to the needle beating 45d through an oil gallery 72b of the distance collar 45c. An outer oil groove 72a that allows the engine oil supplied to the needle bearing 45d to circulate therethrough is formed between an inner periphery of the outer hub 45b and an outer periphery of the needle bearing 45d. An outer oil passage 72 that allows communication between the outer oil groove 72a and the fitting portion between the clutch outer 42 and the large-diameter transmission gear 45 is formed in the outer hub 45b. Through the outer oil passage 72, a portion of the engine oil in the first main shaft 31 is supplied to the clutch outer 42, the large-diameter transmission gear 45 or the like.

It should be noted that the second clutch 34 also has the same construction as the first clutch 33 (see FIG. 4). Therefore, the same portion is denoted by the same reference sign, and the detailed description thereof will not be repeated.

Furthermore, the above-described clutch device construction is not limited to twin-clutch transmissions, but also is applicable to general single-clutch transmissions. Also, the above-described clutch device construction is not limited to wet multiplate clutches, but also is applicable to dry or single plate clutches, or alternatively, may be applied to pull type clutches rather than push type clutches.

As described above, the clutches 33 and 34 according to the above-described embodiment each include: the clutch outer 42 and the clutch inner 43 coaxially supported on each of the main shafts 31 and 32; the clutch discs 41a held by engagement with the clutch outer 42; and the clutch plates 41b held by engagement with the clutch inner 43, for switching between the transmission and non-transmission of power between the clutch outer 42 and the clutch inner 43 by bringing the clutch discs 41a and the clutch plates 41b into pressure contact with one another in the clutch axial direction or releasing the pressure contact.

Each of the clutches 33 and 34 includes: the right pressure flange 44a that is supported movably in the clutch axial direction by the clutch inner 43 and brings the clutch discs 41a and the clutch plates 41b into pressure contact with one another in cooperation with the left pressure flange 43a of the clutch inner 43; the pressure ring 44b that moves the right pressure flange 44a with the force toward a clutch connected position input from a pressure mechanism 59 to bring the clutch discs 41a and the clutch plates 41b into pressure contact with one another; the clutch springs 48 that are disposed between the pressure ring 44b and the right pressure flange 44a and transmits, to the right pressure flange 44a, the force toward the clutch connected position input to the pressure ring 44b from the pressure mechanism 59; and the return springs 49 that are disposed between the clutch inner 43 and the right pressure flange 44a and urges the right pressure flange 44a toward the clutch disconnected position with a force smaller than that of the clutch springs 48. The clutch springs 48 and the return springs 49 are disposed parallel to the clutch axial direction. A plane perpendicular to an axis of the clutch passes through the clutch spring and the return spring.

With this structure, when a force toward the clutch connected position is input to the pressure ring 44b of each of the clutches 33 and 34 from the pressure mechanism 59, the pressure ring 44b and the right pressure flange 44a move toward the clutch connected position while elastically deforming the return springs 49 earlier than the clutch springs 48, so that the right pressure flange 44a abuts on either the clutch discs 41a or the clutch plates 41b (the connection of each of the clutches 33 and 34 is started).

Thereafter, when the pressure ring 44b moves further toward the clutch connected position, the clutch springs 48 start to be elastically deformed following the return springs 49, causing the clutch connection state in which the clutch discs 41a and the clutch plates 41b are brought into pressure contact with one another by the spring force thereof.

In other words, the spring force of the clutch springs 48 brings the clutch discs 41a and the clutch plates 41b into pressure contact with one another, and consequently, the moving distance of the pressure ring 44b is proportional to the clutch capacity, thereby allowing precise clutch capacity control.

Furthermore, the clutch springs 48 and the return springs 49 are disposed parallel to each other along the clutch axial direction. A plane perpendicular to an axis of the clutch passes through the clutch spring and the return spring. Thus, the clutches 33 and 34 can be reduced in axial size, as compared with the case where the clutch springs 48 and the return springs 49 are axially aligned.

Also, in each of the above-described clutches 33 and 34, the pressure ring 44b fits movably in the clutch axial direction in the inner periphery of the right pressure flange 44a. Thus, the right pressure flange 44a and the pressure ring 44b can be compactly disposed in the clutch axial direction.

Further, each of the above-described clutches 33 and 34 is provided with the plural springs 48 and 49, the springs 48 and 49 being alternately arranged in the clutch rotation direction, thereby allowing well-balanced and efficient arrangement of the springs 48 and 49.

Moreover, in each of the above-described clutches 33 and 34, the clutch inner 43 is provided, in the cylindrical wall 43b thereof which supports the clutch plates 41b, with the notch 68 serving as a receiving portion of each of the return springs 49. Thus, the return springs 49 can be disposed immediately on the inner peripheral side of the clutch plates 41b, thereby allowing reductions in radial size of the clutches 33 and 34.

Also, in each of the above-described clutches 33 and 34, the right pressure flange 44a is provided with the detents 70 that engage in a non-relatively-rotatable manner the leading ends of the notches 68 on the side on which the right pressure flange 44a is located. Thus, the relative rotation between the clutch inner 43 and the right pressure flange 44a can be efficiently restricted by using the notches 68 for receiving the return springs 49.

Also, in each of the above-described clutches 33 and 34, the right pressure flange 44a has the inner supporting portion 65 that protrudes coaxially toward the clutch inner 43. The inner supporting portion 65 has: the outer cylindrical wall 65a that extends toward the clutch inner 43 from the right pressure flange 44a; the bottom wall 65b that extends toward the clutch inner periphery from an end of the outer cylindrical wall 65a on the side on which the clutch inner 43 is located; and the inner cylindrical wall 65c that rises from an inner peripheral edge of the bottom wall 65b toward the right pressure flange 44a. The inner periphery of the inner cylindrical wall 65c is fitted and supported on the outer periphery of the hub 43d of the clutch inner 43. Also, the clutch springs 48, having one end supported by the pressure ring 44b, have the other end that is supported by the folded-back portion (the left recess 67) of the right pressure flange 44a which is surrounded by the outer cylindrical wall 65a, the bottom wall 65b, and the inner cylindrical wall 65c. Thus, positioning of the clutch springs 48 can be facilitated, and the clutch springs 48 can be disposed in a stretchable manner.

Additionally, in each of the above-described clutches 33 and 34, the inner oil passage 71 formed in the clutch inner 43 opens toward the folded-back portion (the left recess 67) of the right pressure flange 44a, thereby allowing efficient supply of oil to the fitting portion between the clutch inner 43 and the right pressure flange 44a.

It should be understood that the present invention is not limited to the foregoing embodiment. Examples of the above-described power unit engine include not only air-cooled single-cylinder engines, but also various types of reciprocating engines such as parallel or V-type multicylinder engines and longitudinal engines with a crankshaft parallel to a vehicle front-rear direction as well as water-cooled engines.

In addition, examples of the saddle-ride type vehicle include general vehicles in which a rider sits astride a vehicle body, and include not only motorcycles (including scooter-type vehicles), but also three-wheeled vehicles (including vehicles having one wheel in front and two in the rear, as well as vehicles having two wheels in front and one in the rear) or four-wheeled vehicles (such as ATVs (All Terrain Vehicles)).

It should be also understood that the construction according to the foregoing embodiment is only illustrative of the present invention, and various changes may be made without departing from the scope of the present invention.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A clutch device including, a clutch outer and a clutch inner coaxially supported on a rotating shaft, outer friction plates held by engagement with the clutch outer, and inner friction plates held by engagement with the clutch inner, for switching between transmission and non-transmission of power between the clutch outer and the clutch inner by bringing the outer and inner friction plates into pressure contact with one another in a clutch axial direction or releasing the pressure contact therebetween, the clutch device comprising:

a clutch piston that is supported movably in the clutch axial direction by the clutch inner and brings the outer and inner friction plates into pressure contact with one another in cooperation with a supporting portion of the clutch inner;

a pressure ring that moves the clutch piston with a force toward a clutch connected position, the force toward the clutch connected position bringing the outer and inner friction plates into pressure contact with one another;

a clutch spring that is disposed between the pressure ring and the clutch piston and transmits the force toward the clutch connected position from the pressure ring to the clutch piston; and a return spring that is disposed between the clutch inner and the clutch piston and urges the clutch piston toward a clutch disconnected position with a force smaller than that of the clutch spring, wherein the clutch spring and the return spring are disposed parallel to the clutch axial direction, wherein a plane perpendicular to an axis of the clutch passes through the clutch spring and the return spring, wherein the clutch inner has a cylindrical wall that supports the inner friction plates, the cylindrical wall being provided with a notch serving as a receiving portion of the return spring, and wherein the clutch piston is provided with a detent, the detent engaging in a non-relatively-rotatable manner an end of the notch on a side on which the clutch piston is located, and wherein the clutch piston has an inner supporting portion that protrudes coaxially toward the clutch inner, the inner supporting portion including an outer cylindrical wall that extends toward the clutch inner from the clutch piston;

a bottom wall that extends toward a clutch inner periphery from an end of the outer cylindrical wall on a side on which the clutch inner is located; and an inner cylindrical wall that rises from an inner peripheral edge of the bottom wall toward the clutch piston, wherein an inner periphery of the inner cylindrical wall is fitted and supported on an outer periphery of a hub of the clutch inner, and the clutch spring having one end supported by the pressure ring and the other end supported by a folded-back portion of the clutch piston, the folded-back portion being surrounded by the outer cylindrical wall, the bottom wall, and the inner cylindrical wall.

2. The clutch device according to claim 1, wherein the pressure ring fits movably in the clutch axial direction in an inner periphery of the clutch piston.

3. The clutch device according to claim 1, wherein the clutch spring and the return spring includes a plurality of clutch springs and a plurality of return springs, respectively, the plurality of clutch and return springs being alternately arranged in a clutch rotation direction.

4. The clutch device according to claim 2, wherein the clutch spring and the return spring includes a plurality of clutch springs and a plurality of return springs, respectively, the plurality of clutch and return springs being alternately arranged in a clutch rotation direction.

5. The clutch device according to claim 1, wherein the clutch inner is formed with a feed oil passage, the feed oil passage opening toward the folded-back portion of the clutch piston.

* * * * *